United States Patent
Weinstein et al.

(10) Patent No.: US 6,301,546 B1
(45) Date of Patent: Oct. 9, 2001

(54) PROCESS FOR DETECTING AND MONITORING CHANGES IN PROPERTIES OF FLUIDIZED BED SOLIDS BY PRESSURE DIFFERENCE FLUCTUATION MEASUREMENT

(75) Inventors: Herbert Weinstein, Teaneck; Robert H. Shabaker, Chatham, both of NJ (US); Mark L. Tiller; James H. Taylor, both of Baton Rouge, LA (US); Darrell R. Pitzer, Denham Springs, LA (US)

(73) Assignee: Exxon Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/236,152

(22) Filed: Jan. 22, 1999

(51) Int. Cl.$^7$ ............................. G01N 31/00; G06F 19/00
(52) U.S. Cl. ................................. 702/23; 702/50; 422/62; 422/111; 422/140; 700/266
(58) Field of Search .................. 702/23, 50; 422/62, 422/106, 110–111, 139–140; 700/266, 268

(56) References Cited

U.S. PATENT DOCUMENTS

| | | | |
|---|---|---|---|
| 4,336,227 | * 6/1982 | Koyama et al. | 422/111 |
| 4,755,358 | * 7/1988 | Voll et al. | 422/106 |
| 4,858,144 | 8/1989 | Marsaly et al. | 364/496 |
| 5,043,283 | * 8/1991 | Endo et al. | 422/140 |
| 5,047,209 | * 9/1991 | Lenczyk | 422/62 |
| 5,421,842 | 6/1995 | Shabaker et al. | 48/198.6 |
| 5,435,972 | 7/1995 | Daw et al. | 422/108 |

OTHER PUBLICATIONS

J. Ruud van Ommen et al, "Monitoring Fluidization Dynamics for Detection of Changes in Fluidized Bed Composition and Operating Conditions", Proceedings of the ASME Heat Transfer Division, HTD–vol. 361–5, vol. 5, 1998, pp. 395–404, XP000914007.
D. Bai et al, "Characterization of Gas Fluidization Regimes Using Pressure Fluctuations", Powder Technology, vol. 87, No. 2, May 1996 (1996–05), pp. 105–111, XP000913954, ISSN 0032–5910.

* cited by examiner

Primary Examiner—Marc S. Hoff
Assistant Examiner—Bryan Bui
(74) Attorney, Agent, or Firm—Jay Simon; Charles J. Brumlik

(57) ABSTRACT

A process for detecting, and monitoring, changes in the properties of a fluidized bed of particulate solids, especially a fluidized bed of particulate catalytic solids at elevated temperature wherein a low molecular weight hydrocarbon is converted, in the presence of steam and oxygen, to synthesis gas. Measurement is made of the magnitude of differential pressure fluctuations taken at different levels of bed elevation and these are recorded as a standard deviation, or normalized standard deviation, and directly related to particle size changes caused by agglomeration (growth) and/or attrition (size reduction). Operation of the process requires the use of fast response pressure transducers that are located in the bed and connected to an A/D board of a PC which records and accumulates the data for processing, and analysis.

10 Claims, 3 Drawing Sheets

PROCESS FOR DETECTING AND MONITORING CHANGES IN PROPERTIES OF FLUIDIZED BED SOLIDS BY PRESSURE DIFFERENCE FLUCTUATION MEASUREMENT

1. FIELD OF THE INVENTION

This invention relates to a process for detecting, and monitoring, changes in the properties of a fluidized bed of particulate solids; particularly solids particles agglomeration and/or attrition over a period of time by direct measurement of the magnitude of differential pressure fluctuations at different bed levels which can be directly related to changing particle size.

2. BACKGROUND

Processes are known which utilize fluidized bed techniques wherein a bed of a particulate solid, or solids, for conducting various interactions and/or reactions is contacted with upflow gases the velocity of which exceeds the minimum fluidization velocity, and which may even exceed the free fall velocities of the individual particles causing bed expansion and fluidization of the particles without sweeping significant amounts of the particles from the bed. Fluidized beds are employed in many industrial applications which involve interactions or reactions between a gaseous phase and solid particles.

In a particularly important type of process, now under development, it is known, e.g., to produce synthesis gas ($H_2$+CO) from low molecular weight hydrocarbons, primarily methane, reacted in the presence of steam and oxygen at high temperatures within a fluidized bed of catalyst, typically nickel-on-alumina, or a mixture of catalyst and particulate solids diluent used to aid in controlling the heats of reaction. The combination of high temperature and presence of oxygen in such reaction however creates conditions which make careful control, stability, and steady state operation acutely necessary; however difficult. The surface of the particulate catalytic solids thus becomes sticky and tends to agglomerate, leading to lowered catalyst efficiency (lower conversion), and larger particles that are more difficult to fluidize; and/or the production of fine particles due to abrasive impacts and attrition with concomitant loss of catalyst from the reactor, and clogged lines. In some other fluidized bed operations, e.g., gas-phase polyethylene plant reactors, particles grow in size due to the polymerization reaction without any fluidization pathology taking place. Control for such operations is known, or required to maintain conditions so that the growing particles do not become sticky and agglomerate; and devices have been developed and used in the past, with varying degrees of success to maintain the operational stability of such fluidized bed operations.

In accordance with U.S. Pat. No. 5,435,972 to Daw and Hawk, e.g., differential pressure sensing devices have been employed as a means of sensing, and controlling fluid bed operations. Thus, a differential pressure sensing device utilizing a pair of pressure taps is located axially one tap above the other, or at different levels across a fluidized bed to obtain an analog signal. Daw and Hawk employ the analog signal with an electrical circuit and work in real time to control the feed gas velocity to the fluidized bed.

In accordance with U.S. Pat. No. 4,858,144, as in the control method of Daw and Hawk, supra, Marsaly et al likewise generate an analog signal representative of "the time varying pressure drop" across a "segment of the bed". They employ a differential pressure recording device, digitize the analog signal with an A/D board, collect the data in a PC, and thereafter use a Fast Fourier Transform of the data set to determine recognizable cyclical events present in the fluidized bed. Comparison is then made between a bed which is operating "properly" vis-a-vis one operating "improperly." Thus, if subsequent data sets examined by Fourier transform exhibit altered states and/or different cyclical events it is apparent that the nature of the fluidization process has changed. These changes are thus considered as indicators of fluidization "pathology"; a type of signature analysis as applied in rotating machinery development. Both Daw and Hawk and Marsaly et al offer processes for analysis of events marked by differential pressure fluctuations, but neither is very effective in tracking changes in particle size, or bubble size; properties which are closer to, and more directly related to variables which affect fluid bed operations; particularly syn gas operations, a process for the better control of which there is a pressing need.

3. STATEMENT OF THE INVENTION

The present invention, which meets this need and others, relates to a process which measures the differential pressure changes across a vertical, or axial, segment of a fluidized bed, particularly the vertical segment of a fluidized bed used in conducting fluid bed synthesis gas operations, analyzes the mean differential pressure to obtain the standard deviation, SD, preferably the normalized standard deviation, NSD, of the pressure fluctuation about the mean value, and repetitively collects and processes the data at time intervals sufficiently short compared to the time period required for particle size growth to lead to process failure. The process requires the use of fast response pressure transducers that are connected to an analog-digital, A/D, board in a personal computer, PC, which can sample and collect the data at speeds of at least 50 Hz for a period of about 1 to 3 minutes. The collection and processing of the data is preferably repeated at time intervals ranging from about 1 minute to about 5 minutes, over a total period of time ranging from about 2 minutes to about 30 minutes. The time record of the SD and NSD, at steady state operation it is found, will initially show a constant value which can be directly related to particle size, and as SD or NSD increases or decreases the change can be directly related to increases or decreases, respectively, in particle size.

The vertical height of the bed, or axial vertical segment of the bed across which a differential pressure measurement is made should generally range from 0.1 of a bed diameter to about 2 bed diameters, preferably from about 0.25 bed diameter to about 1.5 bed diameters to obtain sufficiently large and useful signals for analysis.

The characteristics of a preferred process, as well as the principle of operation of the process, will be more fully understood by reference to the following detailed description, and to the attached drawings to which reference is made in the description. The various features and components in the drawings are referred to by numbers, similar features and components being represented in the different figures by similar numbers.

4. REFERENCE TO THE DRAWINGS

FIG. 1 schematically depicts a preferred process for the process of this invention; the figure referring specifically to a controlled fluidized bed syn gas, FBSG, reactor fitted with control devices in accordance with this invention.

5. DETAILED DESCRIPTION

Figure 1:
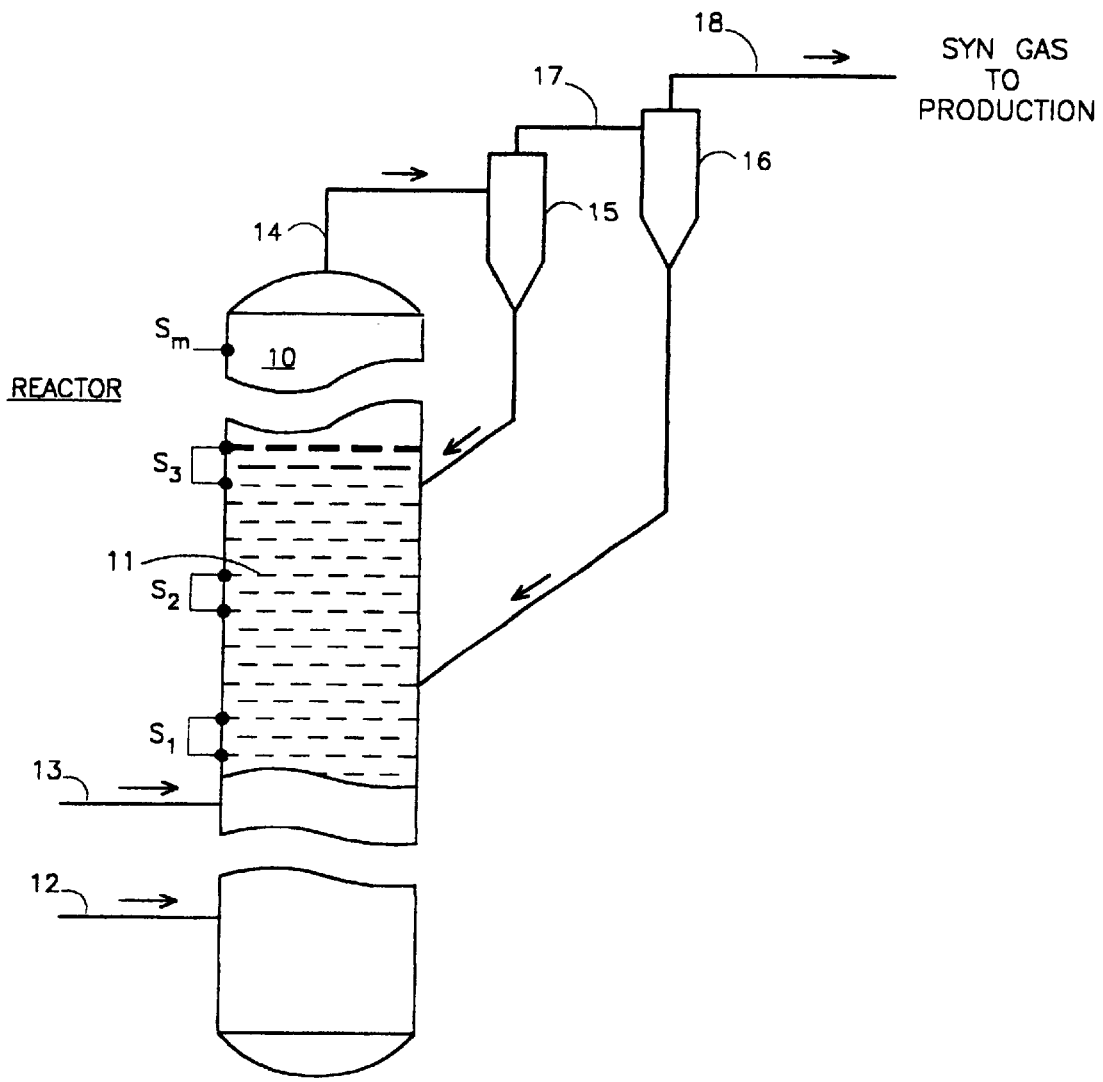

Referring to FIG. 1, there is shown a reactor 10 which contains a fluidized bed 11 of a catalyst wherein partial oxidation and steam reforming reaction are conducted simultaneously at temperatures ranging from about 1500° F. to about 1900° F., preferably from about 1600° F. to about 1800° F. The fluidized bed preferably also contains a particulate solids diluent to disperse heat, suitably high purity alpha alumina. Generally, the bed is constituted of from about 10 percent to about 99.9 percent, preferably from about 80 percent to about 99.5 percent, of the solid diluents component and from about 0.1 percent to about 90 percent, preferably from about 0.5 percent to about 20 percent, of the catalyst, based on the total weight of the particulate solids constituting the fluidized bed. A mixture of hydrocarbons, e.g., $C_1$–$C_4$ alkanes, predominantly methane, diluted with steam is fed into the reactor 10 via line(s) 12, and a mixture of oxygen diluted with steam is fed into the reactor 10 via line(s) 13; or the hydrocarbons, oxygen and steam can be fed separately into the reactor 10 below a grid, not shown, via lines not shown. An effluent hydrogen and carbon monoxide product, and carbon dioxide, steam and unconverted hydrocarbons exits overhead via line 14, cyclone separators 15, 16 trapping some of the catalyst particles and fines, returning them via their respective diplegs to the reactor. The product synthesis gas is removed from the reactor via line 18. The mean average diameter of the solids particles constituting the fluidized bed 11 generally ranges from about 30 microns to about 150 microns, preferably from about 60 microns to about 90 microns.

The catalyst employed in fluidized bed 11 is constituted generally of a refractory inorganic oxide carrier, or support, particularly alumina, and more particularly alpha alumina, composited with a metal, or metals, e.g., iron, nickel, platinum, ruthenium or the like, catalytic for the production of hydrogen and carbon monoxide from low molecular weight hydrocarbons contacted with a fluidized bed of the catalyst at high temperature hydrothermal conditions. Preferably, the catalyst is a nickel-on-alumina catalyst, more preferably a nickel-on-alpha alumina catalyst.

The preferred catalyst contains from about 1 percent to about 20 percent nickel, preferably from about 5 percent to about 20 percent nickel, composited with an alumina, preferably an alpha alumina support. These catalytic particles typically make up 5 wt. percent to 10 wt. percent of the particle mass in the bed, the rest being diluent.

Figure 2:
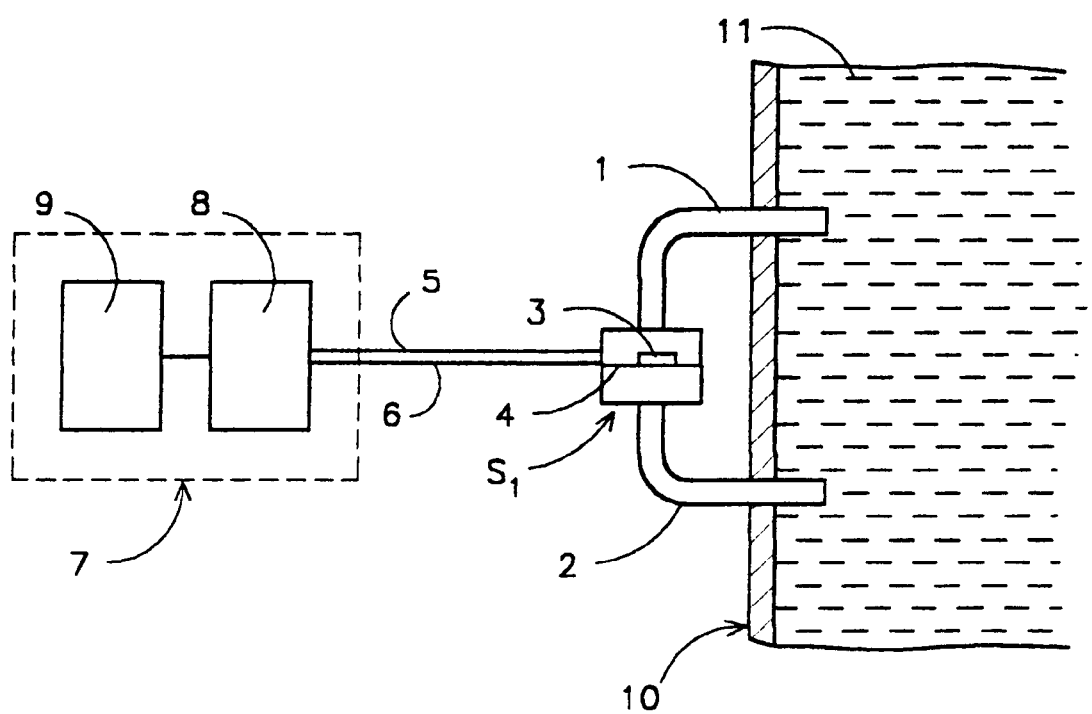
FIG. 2 depicts in somewhat greater detail a control device of this invention as described in the preceding figure.

A plurality of sensing devices $S_1$, $S_2$, $S_3$—$S_n$ are located at different vertical levels, or heights along the fluidized bed 11; each device, e.g., $S_1$, $S_2$ or $S_3$ as depicted in FIG. 2, being designed for measuring pressure differentials between different bed levels. Differential pressures are thus measured by pressure taps located at two different bed levels, a first pressure sensing tap of a sensing device S being located within the fluidized bed 11 while a second sensing tap, with which the first pressure sensing tap is paired, is located above or below the first sensor tap, preferably also within the fluidized bed 11.

The operation and function of a pressure sensor S is best described by reference to FIG. 2. Referring to FIG. 2, there is shown a pressure sensing device $S_1$, or a differential sensor, constituted of two tubular members 1, 2 a terminal end of each of which is projected through the wall of a reactor 10 at two different levels of elevation within the fluidized bed 11, pressure being transmitted from the bed through the two tubes, dependent upon the pressure at each bed level. The vertical distance between the two pressure taps, or tap spacing, should be between the average bubble diameter anticipated in the fluidized bed, and one and one-half bed diameters. The opposite terminal ends of each of the two tubular members 1, 2 are in contact with a differential pressure sensor 3 with high frequency response, usually twice the sampling frequency, or greater (e.g., 3× greater), and constituted of a deformable diaphragm 4. The two pressure components act on the two faces of the diaphragm 4, which deforms due to the different magnitudes of the two pressure components. An electrical signal is created which is a function of the extent of the diaphragm deformation. This signal is carried by the two conductors 5, 6. The diaphragm 4 thus converts the pressure oscillations into an electrical voltage representative of an analog image of the differential pressure.

The analog signal from the differential pressure sensor $S_1$ is carried by conductors 5, 6 to a signal processing unit 7, a device which may constitute means for discriminating between the portion of the signal representing frequencies characterizing background noise and the portion of the signal characterizing the pressure differential, and thence to an analog-to-digital converter 8. The digitized signal is then fed into the PC 9, the data is accumulated in the PC, and the accumulated data processed to provide the mean differential pressure and standard deviation, S.D., preferably the normalized standard deviation, NSD, of the pressure fluctuations about the mean value. The collection and processing of the data is repeated at time intervals which are relatively short compared to the period required for particle growth to lead to process failure. The SD, and NSD time record will show a constant value as long as the bed operates at steady state. When the particle size growth begins due to some process upset or other initiator, the SD and NSD values will begin to increase, and will increase in proportion to the growth, or increase in the mean particle size of the particles. As the growth in particle size increases, process modifications, and changes can be initiated to maintain the stability of the operation.

Typically, in fluidized bed reactors bubbles form at or near the distributor or inlet nozzles and remain in this condition as they rise at diameters which are small compared to the bed diameter, i.e., less than ¼ of the bed diameter. Small bubbles move freely up the bed unhindered by the presence of the reactor walls. The gas superficial velocity and density at the pressure and temperature of operation and the powder properties, i.e., average particle diameter and density, determine the bubble diameter. For example, during the time course of bed operation, the particle size grows due to agglomeration, or decreases in size due to attrition; the bubble size increasing or decreasing, respectively, in response to the particle size change. The fluctuations in the pressure difference measured across a vertical section of the bed will thus be related to the size of the bubbles passing through this vertical section, and can be used to track changes in the bed.

The pressure transducers must have a minimum frequency response greater than twice the highest frequency of the signal of the passing bubbles or slugs, $f_m$. Typically 50 Hertz is sufficient. The differential pressure signal is sampled at the frequency of $f_m$ or greater, and over a length of time sufficient to provide a time average value of pressure difference that changes very little, i.e., less than 5% when additional readings are included in the average. This time of averaging is typically 1 to 5 minutes. Either the standard deviation, SD, of the fluctuations in the differential pressure reading or the SD divided by the time-average value of the differential pressure, the normalized standard deviation, NSD, is taken as the description of bed operation. The value of SD or NSD is then compared over the time of bed operation, typically as a graph of SD or NSD vs. Operating time. Trends of change in the value of NSD with time describe changes in bed fluidization behavior. An increasing value of SD or NSD over the time of operation of the bed show that the sizes of the particulate solids are changing to result in an effective increase in particle mean diameter. This change could be caused by agglomeration of the particles or a loss of fines from the bed. Conversely, a decreasing value of SD or NSD with time, reduction in particle mean diameter, could be caused by particle attrition.

The process of this invention provides an ongoing method for directly measuring particle growth (or reduction), knowledge of which signals an early warning of particle agglomeration. This knowledge permits bed operation at temperatures much closer to optimal, since the process will signal the start of a phenomenon, transient or otherwise, which could result in bogging (bed defluidization) early enough to begin a corrective action, e.g., a temperature change or in sit particle attrition.

The invention will be more fully understood by reference to the following non-limiting example, a simulation in part which illustrates the more salient features of the operation.

EXAMPLE

A reactor is provided with differential pressure sensing devices, and means for recording and analyzing the data output from these devices as described in the preceding detailed description and drawings characterized by reference to FIGS. 1 and 2. Separate hydrocarbon feed gas and oxygen gas nozzles are used to direct the gas streams into the fluidized bed of the reactor, which contains a mixture of particulate catalyst and solids diluent heat transfer particles. In the operation, the hydrocarbon feed gas is constituted of a mixture of natural gas, steam and carbon dioxide. The oxygen gas stream also contains some steam and carbon dioxide, the reaction operating at 1750° F. and 350 psig to produce hydrogen and carbon monoxide via the steam reforming, and partial oxidation reactions. The composition of the feed to the reactor is as follows:

| Hydrocarbon Feed Gas Stream | |
|---|---|
| Moles of Natural Gas | 0.32 |
| Moles Steam/Moles Natural Gas | 0.21 |
| Moles CO$_2$/Moles Natural Gas | 0.05 |
| Oxygen Gas Stream | |
| Moles O$_2$/Moles Natural Gas | 0.62 |
| Moles Steam/Moles Oxygen | 0.40 |
| Moles CO$_2$/Moles Oxygen | — |

The normal gas composition of the effluent from the FBSG reactor has the following composition:

| Component | Mole % |
|---|---|
| CH$_4$ | 2.6 |
| CO | 23.6 |
| H$_2$ | 50.8 |
| CO$_2$ | 4.4 |
| H$_2$O | 15.9 |
| Total | 100.0 |

Figure 3:
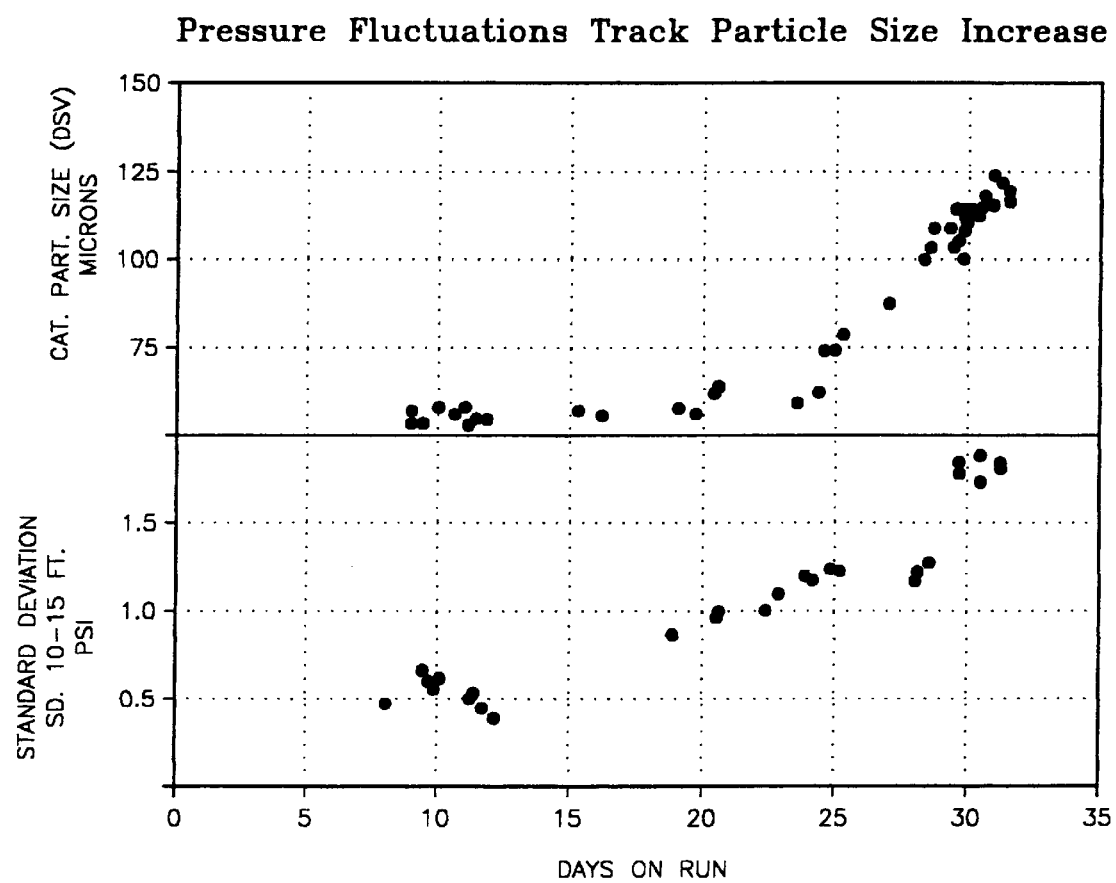
FIG. 3 depicts the results obtained in the use of a control device of this invention to detect, and monitor changes in the size of solids particles during an FBSG operation as exemplified in the specification.

In the course of the reaction in the hot fluidized bed particle agglomeration occurs. FIG. 3 shows the change in SD vs Operating Time for a particular period of bed operation. It is seen that SD increases continually with time, indicating agglomeration of the particles in the bed. Samples of the bed solids were taken at various times during the period of bed operation and analyzed to obtain the mean particle diameter. These values of mean particle diameter are also plotted in FIG. 3. The mean particle diameter increasing with time in the same manner as the SD showing that the SD tracks the change in mean particle diameter directly.

It is apparent that various modifications and changes can be made without departing the spirit and scope of the invention.

Having described the invention, what is claimed is:

1. A process for detecting, and monitoring, changes in the size of the particulate solids and resulting bubble size of a bed fluidized by ascending gases as caused by particle agglomeration or attrition, or both particle agglomeration and attrition during interaction or chemical reaction between said gas and solids which comprises:

sensing the pressures across a segment of the fluidized bed at different vertical levels to obtain a differential pressure, collecting a plurality of the differential pressures to obtain a mean value and a standard deviation of pressure fluctuations about the mean value, repetitively collecting and processing the differential pressure at time intervals sufficiently short compared to the time period required for particle size change sufficient to cause process failure, and correlating, and comparing the standard deviation over time to obtain and track changes in the size of the particulate solids.

2. The process of claim 1 wherein a vertical segment of the bed across which a differential pressure measurement is taken ranges in size from about 0.1 bed diameter to about 2 bed diameters.

3. The process of claim 2 wherein the vertical segment of the bed across which the differential pressure measurement is taken ranges from about 0.25 to about 1.5 bed diameters.

4. The process of claim 1 wherein fast response pressure transducers are used to measure the differential pressures, the pressure transducers are connected to an A/D board to convert from an analog to a digital signal, and the digital signal is fed into a PC which can sample and collect the data to speeds of at least 50 Hz for a period of about 1 to 3 minutes.

5. The process of claim 4 wherein the collection and processing of the data is repeated at time intervals ranging from about 1 minute to about 5 minutes, over a total period of time ranging from about 2 minutes to about 30 minutes.

6. In the production of hydrogen and carbon monoxide in a reaction zone by contacting together and reacting a low molecular weight hydrocarbon feed, steam and oxygen fed into the reaction zone to produce, at elevated temperatures, partial oxidation and steam reforming reactions, wherein the improvement comprises:

sensing a differential pressure across a segment of the fluidized bed at different vertical levels, collecting a plurality of the differential pressures to obtain a mean value and a standard deviation of pressure fluctuations about the mean value, repetitively collecting and processing the data at time intervals sufficiently short compared to the time period required for particle size change sufficient to cause process failure, and correlating, and comparing the standard deviation over time to obtain and track changes in the size of the particulate solids.

7. The process of claim 6 wherein a vertical segment of the bed across which a differential pressure measurement is taken ranges in size from about 0.1 bed diameter to about 2 bed diameters.

8. The process of claim 7 wherein the vertical segment of the bed across which the differential pressure measurement is taken ranges from about 0.25 to about 1.5 bed diameters.

9. The process of claim 6 wherein fast response pressure transducers are used to measure the differential pressures, the pressure transducers are connected to an A/D board to convert from an analog to a digital signal, and the digital signal is fed into a PC which can sample and collect the data to speeds of at least 50 Hz for a period of about 1 to 3 minutes.

10. The process of claim 9 wherein the collection and processing of the data is repeated at time intervals ranging from about 1 minute to about 5 minutes, over a total period of time ranging from about 2 minutes to about 30 minutes.

* * * * *